(No Model.)
M. A. SHELDON.
BICYCLE STAND.
No. 594,433. Patented Nov. 30, 1897.
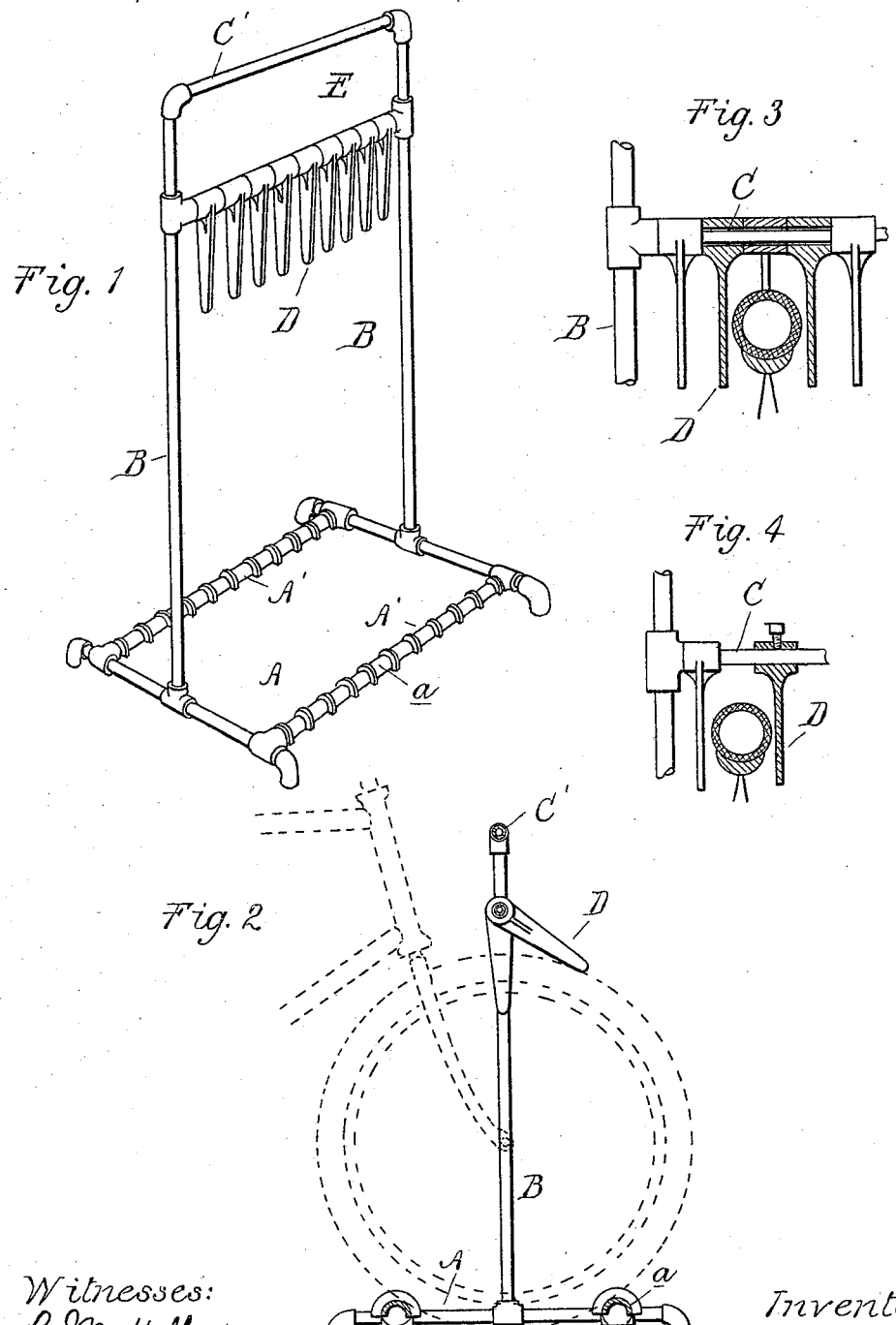
Witnesses:
P. M. Hulbert
Otto F. Barthel
Inventor:
Mark A. Sheldon
By Sprague
Attys.

UNITED STATES PATENT OFFICE.

MARK A. SHELDON, OF DETROIT, MICHIGAN.

BICYCLE-STAND.

SPECIFICATION forming part of Letters Patent No. 594,433, dated November 30, 1897.

Application filed September 14, 1896. Serial No. 605,794. (No model.)

*To all whom it may concern:*

Be it known that I, MARK A. SHELDON, a citizen of the United States, residing at Detroit, in the county of Wayne and State of Michigan, have invented certain new and useful Improvements in Bicycle-Stands, of which the following is a specification, reference being had therein to the accompanying drawings.

My invention relates to a bicycle-stand in which the individual divisions of the ordinary bicycle-stand into which the bicycles have to be guided are omitted and other devices substituted by means of which the bicycle need not be guided to find a position in which it is supported; and my invention consists of placing on the upper cross-bar of the stand a series of pendent fingers, and in connection therewith the base may or may not be formed with a corresponding series of grooves for the wheels to rest in, all as more fully hereinafter described, and shown in the drawings, in which—

Figure 1 is a perspective view of my improved bicycle-stand. Fig. 2 is a cross-section showing in dotted outlines a wheel in position. Fig. 3 is a vertical section on the axis of the cross-bar, and Fig. 4 is a similar view of the parts slightly modified.

A is the base of the stand. B and B are two vertical standards supported thereon, and C is the upper cross-bar uniting the upper ends of the standards. Upon this cross-bar are sleeved a series of pendent fingers D, which divide the space between the vertical standards in such manner that the space between the two alternate fingers is sufficient to admit the bicycle-wheel. The parts being thus constructed and arranged, all that is required to support a bicycle in the stand is to insert it within the standards sufficient to bring the wheel to rest upon the cross-bars of the base, while the upper portion of the wheel will find a place for itself by pushing aside one of the pendent fingers, as shown in Fig. 2. The two adjacent fingers will then hold the wheel in the usual manner from falling sidewise.

If desired, the transverse cross-bars A A' of the base may be formed on their upper side with individual grooves $a$ for the rim of the wheel to rest on; but this is not essential with my invention, although the bicycle will have a firmer rest, as in my construction the bicycle finds a rest wherever it is inserted into the stand without being guided. It is much more convenient than the ordinary stand, and besides the omission of the vertical division-bars avoids any possible injury to the wheel.

While not quite as convenient as the construction before described, I wish to include within the spirit of my invention the modified construction shown in Fig. 4, in which the fingers are made fast upon the cross-bar and spaced far enough apart to afford room for the rim between them. This arrangement, while needing the guidance of the operator to insert the wheel, still requires much less attention than the construction which has vertical division-bars for the whole height of the standard.

I preferably construct my frame in a simple manner of gas-pipe and, as shown in Fig. 1, extend the standards upwardly above the cross-bars C and unite them by a supplementary cross-bar C', thereby forming a space E for the display of a sign or advertising matter or other decorative feature, such as a mirror, &c.

My invention may be readily applied to form a bicycle-stand as a permanent fixture on a building or other support, simply securing the cross-bar C at the proper height from the ground into the support, so as to project in the form of a bracket carrying the pendent fingers, or railings of stairways or like inclosures may be utilized for the purpose and such forms of brackets or railings may be integrally cast or formed.

What I claim as my invention is—

1. In a bicycle-stand, the combination of a substantially horizontal bar, supporting means for said bar, a series of pendent movable fingers on said bar, and means to prevent movement of the fingers longitudinally of the bar.

2. The combination in a bicycle-stand, formed with a wheel-supporting base, of a cross-bar supported above said base, provided with a series of pendent fingers sleeved upon said cross-bar, free to move.

3. In a bicycle-stand, the combination of a substantially horizontal bar, supporting means therefor, and a plurality of pendent fingers sleeved on said bar and prevented from longitudinal movement thereon.

4. The combination in a bicycle-stand of the wheel-supporting base provided with the grooved cross-bars A', the vertical standards B B, the cross-bars C provided with a series of loose pendent fingers and the supplementary cross-bar C'.

5. In a bicycle-stand, the combination of a wheel-supporting base, standards thereon, a cross-bar between said standards, a plurality of pendent movable fingers on said cross-bar, and means acting to prevent the movement of said fingers longitudinally of the cross-bar.

6. In a bicycle-stand, the combination of a base, a bar above said base, supports for said bar, a series of sleeves on said bar and held from movement longitudinally thereof, and a finger depending from each sleeve.

In testimony whereof I affix my signature in presence of two witnesses.

MARK A. SHELDON.

Witnesses:
   M. B. O'DOGHERTY,
   OTTO F. BARTHEL.